United States Patent
Hunt et al.

(10) Patent No.: US 9,631,923 B2
(45) Date of Patent: Apr. 25, 2017

(54) REAL-TIME NON-LINEAR OPTICAL STRAIN GAUGE SYSTEM

(71) Applicant: The Boeing Company, Chicago, IL (US)

(72) Inventors: Jeffrey H. Hunt, Thousand Oaks, CA (US); John H. Belk, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/493,187

(22) Filed: Sep. 22, 2014

(65) Prior Publication Data

US 2016/0084640 A1 Mar. 24, 2016

(51) Int. Cl.
*G01B 11/16* (2006.01)
*G01L 1/24* (2006.01)

(52) U.S. Cl.
CPC ............ *G01B 11/168* (2013.01); *G01L 1/246* (2013.01)

(58) Field of Classification Search
CPC ............... G01B 11/16; G01J 4/00; H04B 1/18
See application file for complete search history.

(56) References Cited

U.S. PATENT DOCUMENTS

| | | | |
|---|---|---|---|
| 5,564,832 A | 10/1996 | Ball et al. | |
| 6,204,920 B1 | 3/2001 | Ellerbrock et al. | |
| 6,417,507 B1 | 7/2002 | Malvern et al. | |
| 8,345,264 B2 | 1/2013 | Huang et al. | |
| 8,379,217 B2 | 2/2013 | Koste et al. | |
| 8,526,820 B1 | 9/2013 | Atmur et al. | |
| 8,661,912 B2 | 3/2014 | Verbruggen | |
| 2003/0142319 A1 | 7/2003 | Ronnekleiv et al. | |
| 2004/0113055 A1* | 6/2004 | Whelan | G01B 11/18 250/227.18 |
| 2008/0068586 A1* | 3/2008 | Kishida | G01B 11/18 356/32 |
| 2010/0197257 A1* | 8/2010 | Rajkotia | H04B 1/1036 455/188.1 |
| 2011/0228255 A1* | 9/2011 | Li | G01B 11/18 356/33 |

OTHER PUBLICATIONS

Jun. 9, 2016 Office Action in Canadian Patent Application No. 2,898,142.

* cited by examiner

*Primary Examiner* — Tarifur Chowdhury
*Assistant Examiner* — Jamil Ahmed
(74) *Attorney, Agent, or Firm* — Economou Silfin LLP; John S. Economou

(57) ABSTRACT

A system for measuring strain includes an optical fiber having a central portion secured between two fixed points. A first light source outputs light at a first frequency and a second light source outputs light at a second different frequency. The two light sources are both coupled to a first end of the optical fiber. A back scatter detector is also coupled to the first end to receive a return light signal from the optical fiber and outputs a signal based thereon. A forward scatter detector is coupled to a second end of the optical fiber to receive a forward light signal from the optical fiber and outputs a signal based thereon. A processor receives the signals from the back scatter detector and the forward scatter detector and generates an output signal proportional to the strain between the two fixed points based on the received signals.

16 Claims, 3 Drawing Sheets

REAL-TIME NON-LINEAR OPTICAL STRAIN GAUGE SYSTEM

FIELD

This disclosure relates generally to a fiber optic strain measurement system, and more particularly to a fiber optic strain measurement system having a non-linear source signal.

BACKGROUND

In conventional optical fiber-based strain measurement systems, a source signal is directed into an optical fiber and a return signal occurs because of strain imposed in the optical fiber or because of a polarization reconfiguration due to mechanical variations imposed on the optical fiber. The signal to noise ratio for the return signal in such conventional systems is less than optimal because the return signal is much smaller in magnitude than the linear source signal. Bragg gratings can be written into the optical fiber in such systems to produce a larger return signal, but the signal to noise ratio for the return signal remains lower than desired. In addition, the wavelength of the source signal in conventional optical fiber-based strain measurement systems is typically varied across a predetermined range and the return signal is monitored to detect a peak level, with the strain measurement signal corresponding to the wavelength of the source signal when the peak level is detected. This type of system imposes a delay for each measurement corresponding to the time required to sweep the source signal across the range of operating wavelengths.

Accordingly, there is a need for an optical fiber-based strain measurement system having a return signal with a higher signal to noise ratio. In addition, there is a need for an optical fiber-based strain measurement system providing a measurement signal in real-time.

SUMMARY

In one aspect, a system is provided for measuring strain between two fixed points. An optical fiber has a first end, a second end, and a central portion secured between the two fixed points. A first light source outputs a light signal having a first frequency and is coupled to the first end of the optical fiber. A second light source outputs a light signal having a second frequency different from the first frequency and is also coupled to the first end of the optical fiber. A back scatter detector is coupled to the first end of the optical fiber for receiving a return light signal from the optical fiber and outputs a signal based thereon. A forward scatter detector is coupled to the second end of the optical fiber for receiving a forward light signal from the optical fiber and outputs a signal based thereon. A processor is coupled to receive the signals from the back scatter detector and the forward scatter detector. The processor is configured to generate an output signal proportional to the strain between the two points on the structure based on the signals from the back scatter detector and the forward scatter detector.

In a further embodiment, the first light source, the second light source and the back scatter detector may be coupled to the optical fiber via a 3:1 coupler. In addition, the back scatter detector may include a frequency control element configured to have a frequency corresponding to a calculated response frequency based on the first frequency and the second frequency, the calculated response frequency different from the first frequency and the second frequency. Further, the forward scatter detector may include a frequency control element configured to have a frequency corresponding to a calculated response frequency based on the first frequency and the second frequency, the calculated response frequency different from the first frequency and the second frequency. Still further, the central portion of the optical fiber may include Bragg gratings configured to reflect light at a frequency corresponding to a calculated response frequency based on the first frequency and the second frequency, the calculated response frequency different from the first frequency and the second frequency. Also, the first light source may include an intensity control element configured to have a first predetermined intensity, a polarization control element configured to have a first predetermined polarization and a frequency control element configured to have a frequency corresponding to the first frequency. In addition, the second light source may include an intensity control element configured to have a second predetermined intensity, a polarization control element configured to have a second predetermined polarization and a frequency control element configured to have a frequency corresponding to the second frequency. Further, the first predetermined intensity may be the same as the second predetermined intensity. Still further, the first predetermined polarization may be the same as the second predetermined polarization.

In another aspect, a system is provided for measuring strain between two fixed points. An optical fiber has a first end, a second end, and a central portion secured between the two fixed points. A first light source outputs a light signal having a first frequency and is coupled to the first end of the optical fiber. A second light source outputs a light signal having a second frequency different from the first frequency and is also coupled to the first end of the optical fiber. A back scatter detector is coupled to the first end of the optical fiber for receiving a return light signal from the optical fiber and outputs a signal based thereon. A processor is coupled to receive the signal from the back scatter detector. The processor is configured to generate an output signal proportional to the strain between the two points on the structure based on the signal from the back scatter detector.

In yet another aspect, a system is provided for measuring strain between two fixed points. An optical fiber has a first end, a second end, and a central portion secured between the two fixed points. A first light source outputs a light signal having a first frequency and is coupled to the first end of the optical fiber. A second light source outputs a light signal having a second frequency different from the first frequency and is also coupled to the first end of the optical fiber. A forward scatter detector is coupled to the second end of the optical fiber for receiving a forward light signal from the optical fiber and outputs a signal based thereon. A processor is coupled to receive the signal from the forward scatter detector. The processor is configured to generate an output signal proportional to the strain between the two points on the structure based on the signal from the forward scatter detector.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The system disclosed herein applies a source signal to an optical fiber-based sensor which consists of a combination of two different signals, each having a different wavelength. This results in a return signal (both forward and backward) at a third predictable different wavelength. The return signal will be dependent on and indicative of the strain induced in the optical fiber since such strain increases the local non-linearity of the optical fiber. This non-linear system has a much greater signal to noise ratio than conventional linear systems since the return signal is at a different wavelength than the two combined source signals. For a linear system, polarization is linearly related to the electric field associated with the input light signal, according to the equation (1) below:

$$P(\omega) = \chi * E(\omega) \quad (1)$$

In equation (1), $P(\omega)$ represents the material polarization, $E(\omega)$ represents the electric field and $\chi$ represents the optical fiber material response. $P(\omega)$, $E(\omega)$ and $\chi$ are all vector quantities. In contrast, for a non-linear system, the relationship between polarization and electric field associated with the input light signal includes higher order (non-linear) effects, according to equation (2) below:

$$P^2(\omega_1 + \omega_2) = \chi^2 * E_1(\omega_1) * E_2(\omega_2) \quad (2)$$

In this case, $E_1(\omega_1)$ and $E_2(\omega_2)$ are the electric fields associated with the two input light signals, $P^2(\omega_1+\omega_2)$ is the second order polarization, and $\chi^2$ represents the optical fiber response and is a matrix, not a vector, due to the second order effects. There are many other non-linear relationships that can be applied, including, for example, third order effects that result based on an input signals having a relationship such as $2\omega_1-\omega_2$.

Figure 1:
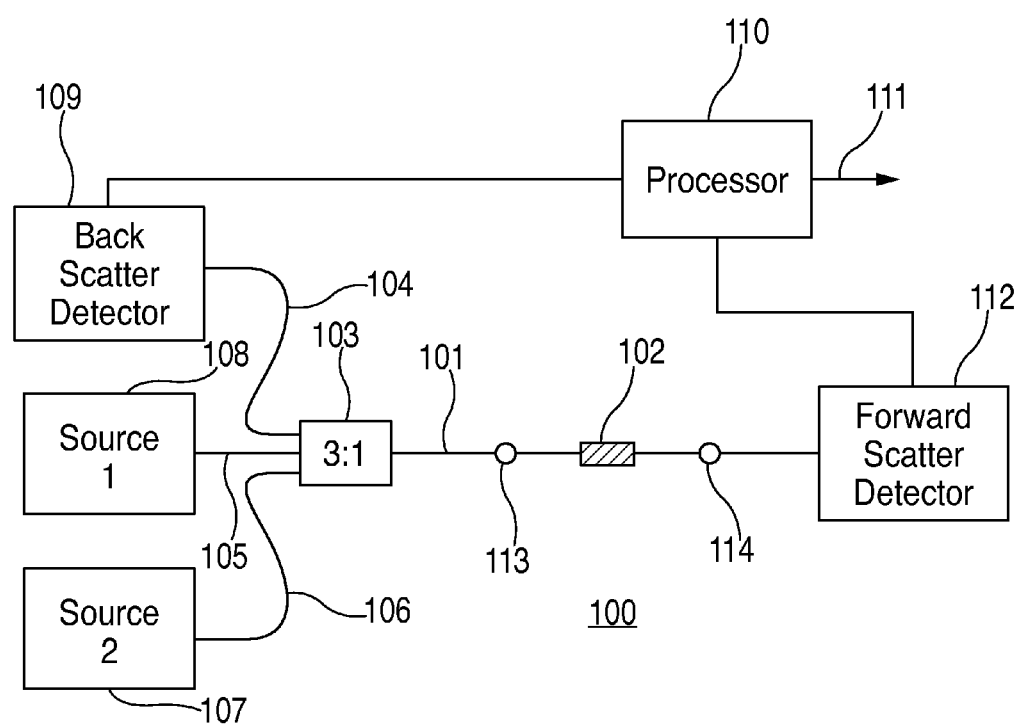
FIG. 1 is a block diagram of a real-time non-linear optical strain gauge system according to an aspect of the present disclosure.

Referring now to FIG. 1, real-time non-linear optical strain gauge system 100 includes an optical fiber 101 that is configured to detect any strain imposed longitudinally along fiber 101 in a central portion 102 that is fixed to a structure between two predetermined fixed points 113, 114. For example, each end of fiber 101 may be fixed in place in a permanent structure such as an aircraft, bridge, wind energy propeller, etc., and system 100 may be used, in accordance with the present disclosure, to detect any strain induced in fiber 101 by any change in the distance between the two fixed points 113, 114. Bragg gratings may be written into optical fiber 101 within the central portion 102 to increase the signal level at the response frequency (and the signal to noise ratio), but are not required.

System 101 includes a first optical light source 108 and a second optical light source 107 (each described below). First optical light source 108 is preferably coupled to a first end of an optical fiber 105 and second optical light source 107 is preferably coupled to a first end of a separate optical fiber 106. The second ends of optical fibers 106, 105 are preferably coupled to a three-in-one coupler 103 that is, in turn, coupled to a first end of optical fiber 101. A back scatter detector 109 is also coupled to the three-in-one coupler 104 via a separate optical fiber 104 to receive a return light signal from optical fiber 101. As one of ordinary skill in the art will readily recognize, there are many alternative ways to couple first optical light source 108, second optical light source 107 and back scatter detector 109 to the first end of optical fiber 101 and all such alternative ways fall within the scope of the present disclosure. Finally, a forward scatter detector 112 is preferably coupled to the second (remote) end of optical fiber 101 to receive a forward light signal from optical fiber 101. In a presently preferred embodiment, the output strain signal (discussed below) is based on outputs from of both back scatter detector 109 and forward scatter detector 112. In one alternative embodiment, forward scatter detector 112 is omitted and the output strain signal is based only on an output from back scatter detector 109. In another alternative embodiment, back scatter detector 109 is omitted and the output strain signal is based only on an output from forward scatter detector 112. A processor 110 is coupled to the back scatter detector 109 and to the forward scatter detector 112 to receive the signals therefrom. Processor 110 generates an output signal 111 based on the signals from back scatter detector 109 and forward scatter detector 112.

Figure 2:
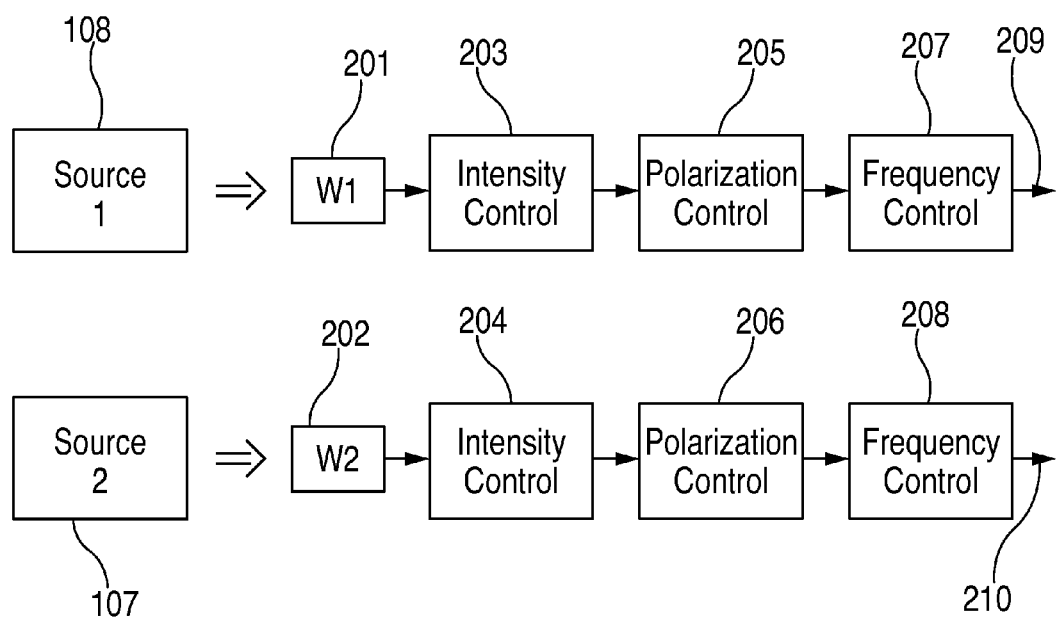
FIG. 2 is a block diagram of an optical light source according to an aspect of the present disclosure.

Referring now to FIG. 2, each optical light source 108, 107 is configured to provide light at a fixed wavelength, a fixed polarization and a fixed intensity. For example, respective light emitting elements 201, 202 may each output light at different wavelengths $\omega_1$, $\omega_2$. The light emitting elements 201, 202 may be any conventional light source used with fiber optic systems, e.g., a light emitting diode or a laser diode. Each light emitting element 201, 201 is preferably provided with respective intensity control elements 203, 204, polarization control elements 205, 206 and frequency control elements 207, 208 so that the respective output signals 209, 210 will have a precise and predetermined intensity, polarization and frequency (wavelength). In some cases, only the frequency will be different between the first optical light source 108 and the second optical light source 107. Intensity controls may include broadband filters for reducing intensity or may specifically refer to certain frequency notch filters which are intended to drop intensity levels where the detectors can act in a linear fashion. Polarization control is typically done with a combination of polarization sensitive optical media, for example, thin-film polarizers, or more elaborate schemes such as Glan-Thompson polarizers systems or Glan-air polarizers systems. Additionally, optics based on Brewster's angle may be used for polarization selectivity. Frequency controls can be accomplished in simple cases by frequency dependent color filters or dielectric filters and in more elaborate by a spectrophotometer that is typically composed of a diffraction grating which operates at a frequency or bandwidth of interest.

Figure 3:
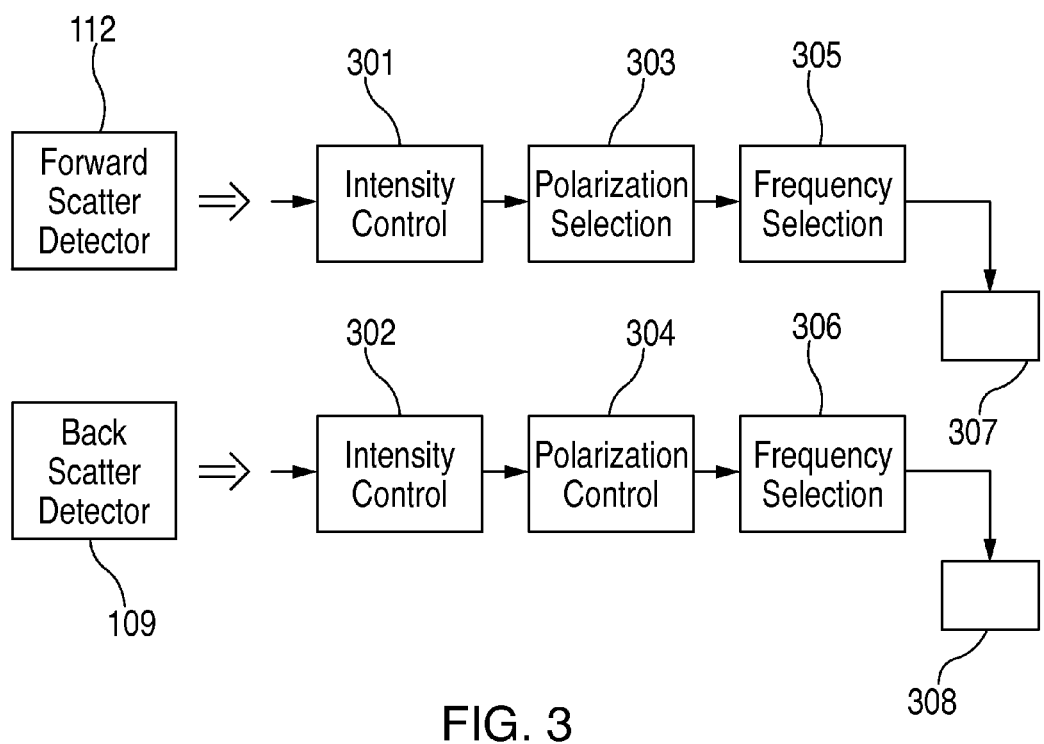
FIG. 3 is a block diagram of a scatter detector according to an aspect of the present disclosure.

Referring now to FIG. 3, each of the forward scatter detector 112 and the back scatter detector 109 is constructed in the same manner and includes respective intensity control elements 301, 302, polarization selection elements 303, 304, a frequency (wavelength) selection elements 305, 306 and detectors 307, 308. When two separate and different light signals 209, 210 are applied together to optical fiber 101, the return signal (both forward and backward) caused by strain induced on optical fiber 101 will occur at a different frequency (wavelength) than the two applied light signals 209, 210. As one of ordinary skill in the art will readily recognize, by applying two separate controlled signals $E_1(\omega_1)$, $E_2(\omega_2)$ to optical fiber 101, the optical fiber material response will cause a second order effect that results in a response signal at a different frequency (wavelength). Since the characteristics of the response signal can be calculated based on the applied signals, each of the intensity control elements 301, 302, polarization selection elements 303, 304, a frequency (wavelength) selection elements 305, 306 can be selected to match the calculated response frequency. As a result, the signals provided to the respective detectors 307, 308 will be proportional to the optical fiber material response and will change based on any cause applied to optical fiber 101. Strains which are produced in the optical fiber 101 will result mechanical displacements at the microscopic level. These mechanical displacements in some cases will result in defects, i.e., microscopic breakages in the fibers. In less severe cases they may merely result in the microscopic ordering or dis-ordering of the material that makes up the optical fiber. Such microscopic changes will result in changes in the hyper polarizability at the local level and subsequently manifest themselves as macroscopic changes in the second or third order non-linear susceptibilities of the optical fiber. Since the signals of interest respond to the changes in those non-linear susceptibilities, the microscopic changes in the strains lead to changes in the second and third order non-linear signals being measured.

By providing a non-linear source signal, the system disclosed herein generates an output signal that has a much higher signal-to-noise ratio than conventional systems having linear source signal. In addition, the use of a non-linear source signal in the system disclosed herein simplifies the detecting circuits, since the return signal will have a predetermined wavelength, and allows a more responsive (effectively real-time) measurement signal.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for measuring strain between two fixed points, comprising:
   an optical fiber having a first end, a second end, and a central portion secured between the two fixed points;
   a first light source outputting a light signal having predetermined characteristics and a first frequency and coupled to the first end of the optical fiber;
   a second light source outputting a light signal having the same predetermined characteristics and a second frequency different from the first frequency and coupled to the first end of the optical fiber;
   a back scatter detector coupled to the first end of the optical fiber for receiving a return light signal from the optical fiber and for outputting a signal based thereon, the back scatter detector including an associated frequency control element having a frequency corresponding to a predetermined calculated response frequency based on the first frequency and the second frequency, the predetermined calculated response frequency different from the first frequency and the second frequency;
   a forward scatter detector coupled to the second end of the optical fiber for receiving a forward light signal from the optical fiber and for outputting a signal based thereon, the forward scatter detector including an associated frequency control element having a frequency corresponding to the predetermined calculated response frequency;
   a processor coupled to receive the signals from the back scatter detector and the forward scatter detector, the processor generating an output signal proportional to the strain between the two fixed points based on a magnitude of the signals from the back scatter detector and the forward scatter detector at the predetermined calculated response frequency; and
   wherein the output signal at the predetermined calculated response frequency is produced based on second order effects applied to the light signal at the first frequency and to the light signal at the second frequency.

2. The system of claim 1, wherein the first light source, the second light source and the back scatter detector are coupled to the optical fiber via a 3:1 coupler.

3. The system of claim 1, wherein the central portion of the optical fiber includes Bragg gratings that reflect light at a frequency corresponding to the predetermined calculated response frequency.

4. The system of claim 1, wherein the first light source includes an intensity control element having a predetermined intensity, a polarization control element having a predetermined polarization and a frequency control element having a frequency corresponding to the first frequency.

5. The system of claim 1, wherein the second light source includes an intensity control element having a predetermined intensity, a polarization control element having a predetermined polarization and a frequency control element having a frequency corresponding to the second frequency.

6. A system for measuring strain between two fixed points, comprising:
   an optical fiber having a first end, a second end, and a central portion secured between the two fixed points;
   a first light source outputting a light signal having predetermined characteristics and a first frequency and coupled to the first end of the optical fiber;
   a second light source outputting a light signal having the same predetermined characteristics and a second frequency different from the first frequency and coupled to the first end of the optical fiber;
   a back scatter detector coupled to the first end of the optical fiber for receiving a return light signal from the optical fiber and for outputting a signal based thereon, the back scatter detector including an associated frequency control element having a frequency corresponding to a predetermined calculated response frequency based on the first frequency and the second frequency, the predetermined calculated response frequency different from the first frequency and the second frequency;
   a processor coupled to receive the signal from the back scatter detector, the processor generating an output signal proportional to the strain between the two fixed points based on a magnitude of the signal from the back scatter detector at the predetermined calculated response frequency; and
   wherein the output signal at the predetermined calculated response frequency is produced based on second order effects applied to the light signal at the first frequency and to the light signal at the second frequency.

7. The system of claim 6, wherein the first light source, the second light source and the back scatter detector are coupled to the optical fiber via a 3:1 coupler.

8. The system of claim 6, wherein the central portion of the optical fiber includes Bragg gratings that reflect light at a frequency corresponding to the predetermined calculated response.

9. The system of claim 6, wherein the first light source includes an intensity control element having a predetermined intensity, a polarization control element having a predetermined polarization and a frequency control element having a frequency corresponding to the first frequency.

10. The system of claim 6, wherein the second light source includes an intensity control element having a predetermined intensity, a polarization control element having a predetermined polarization and a frequency control element having a frequency corresponding to the second frequency.

11. The system of claim 6, wherein the first light source includes an intensity control element having a first predetermined intensity, a polarization control element having a first predetermined polarization and a frequency control element having a frequency corresponding to the first frequency; wherein the second light source includes an intensity control element having a second predetermined intensity, a polarization control element having a second predetermined polarization and a frequency control element having a frequency corresponding to the second frequency; wherein the first predetermined intensity is the same as the second predetermined intensity; and wherein the first predetermined polarization is the same as the second predetermined polarization.

12. A system for measuring strain between two fixed points, comprising:
  an optical fiber having a first end, a second end, and a central portion secured between the two fixed points;
  a first light source outputting a light signal having predetermined characteristics and a first frequency and coupled to the first end of the optical fiber;
  a second light source outputting a light signal having the same predetermined characteristics and a second frequency different from the first frequency and coupled to the first end of the optical fiber;
  a forward scatter detector coupled to the second end of the optical fiber for receiving a forward light signal from the optical fiber and for outputting a signal based thereon, the forward scatter detector including an associated frequency control element having a frequency corresponding to a predetermined calculated response frequency based on the first frequency and the second frequency, the predetermined calculated response frequency different from the first frequency and the second frequency;
  a processor coupled to receive the signal from the forward scatter detector, the processor generating an output signal proportional to the strain between the two fixed points based on a magnitude of the signal from the forward scatter detector at the predetermined calculated response frequency; and
  wherein the output signal at the predetermined calculated response frequency is produced based on second order effects applied to the light signal at the first frequency and to the light signal at the second frequency.

13. The system of claim 12, wherein the central portion of the optical fiber includes Bragg gratings that reflect light at a frequency corresponding to the predetermined calculated response frequency.

14. The system of claim 12, wherein the first light source includes an intensity control element having a predetermined intensity, a polarization control element having a predetermined polarization and a frequency control element having a frequency corresponding to the first frequency.

15. The system of claim 12, wherein the second light source includes an intensity control element having a predetermined intensity, a polarization control element having a predetermined polarization and a frequency control element having a frequency corresponding to the second frequency.

16. The system of claim 12, wherein the first light source includes an intensity control element having a first predetermined intensity, a polarization control element having a first predetermined polarization and a frequency control element having a frequency corresponding to the first frequency; wherein the second light source includes an intensity control element having a second predetermined intensity, a polarization control element having a second predetermined polarization and a frequency control element having a frequency corresponding to the second frequency; wherein the first predetermined intensity is the same as the second predetermined intensity; and wherein the first predetermined polarization is the same as the second predetermined polarization.

* * * * *